United States Patent [19]
Takeda et al.

[11] Patent Number: 5,793,733
[45] Date of Patent: Aug. 11, 1998

[54] POLARIZING BEAM SPLITTER AND METHOD FOR MANUFACTURING SAME

[75] Inventors: Tadashi Takeda; Yoshio Hayashi, both of Nagano; Satoru Nakao, Tokyo; Hideo Takezoe, Tokyo; Ken Ishikawa, Tokyo; Takaaki Suzuki, Tokyo; Atsuo Fukuda, Tokyo, all of Japan

[73] Assignee: Sankyo Seiki Mfg. Co., Ltd., Nagano-ken, Japan

[21] Appl. No.: 702,139

[22] Filed: Aug. 23, 1996

[30] Foreign Application Priority Data

Feb. 27, 1996 [JP] Japan ..................... 8-039988

[51] Int. Cl.$^6$ .................. G11B 7/00; G03F 9/00
[52] U.S. Cl. .................. 369/112; 430/5
[58] Field of Search .................. 369/100, 103, 369/108, 109, 110, 112, 44.12, 44.14; 430/4, 5, 269, 270.1, 292, 293, 320, 321

[56] References Cited

U.S. PATENT DOCUMENTS 5,178,978  1/1993  Zanoni et al. .............. 430/270.1 X 5,493,555  2/1996  Kimura et al. .............. 369/110

FOREIGN PATENT DOCUMENTS 7-325217  12/1995  Japan

*Primary Examiner*—Paul W. Huber
*Attorney, Agent, or Firm*—McAulay Fisher Nissen Goldberg & Kiel, LLP

[57] ABSTRACT

A polarizing beam-splitter comprises an optically isotropics crystalline substrate and a birefringent material layer made of an oriented polydiacetylene film formed on the optically isotropic crystalline substrate. A periodic grating photo-mask is formed in the birefringent material layer by an area that is changed into a different color phase when an ultra violet light is irradiated in a predetermined pattern on the birefringent material layer and by an area in which the color remains unchanged. The periodic grating photo-mask has a diffraction efficiency for the orientation of the oriented polydiacetylene film in the area that is changed into a different color phase which is lower than that in the area in which the color is unchanged.

4 Claims, 4 Drawing Sheets

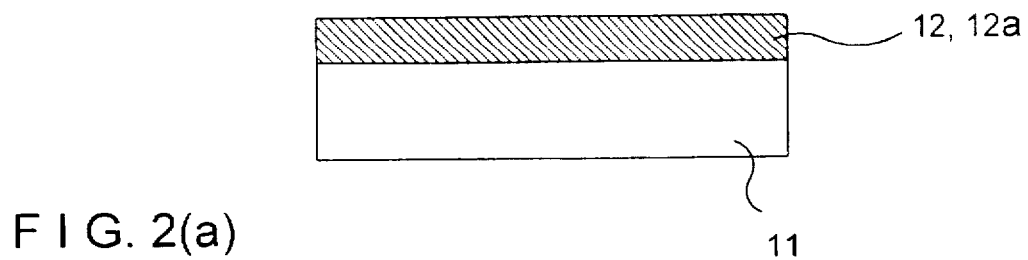
F I G. 2(a)
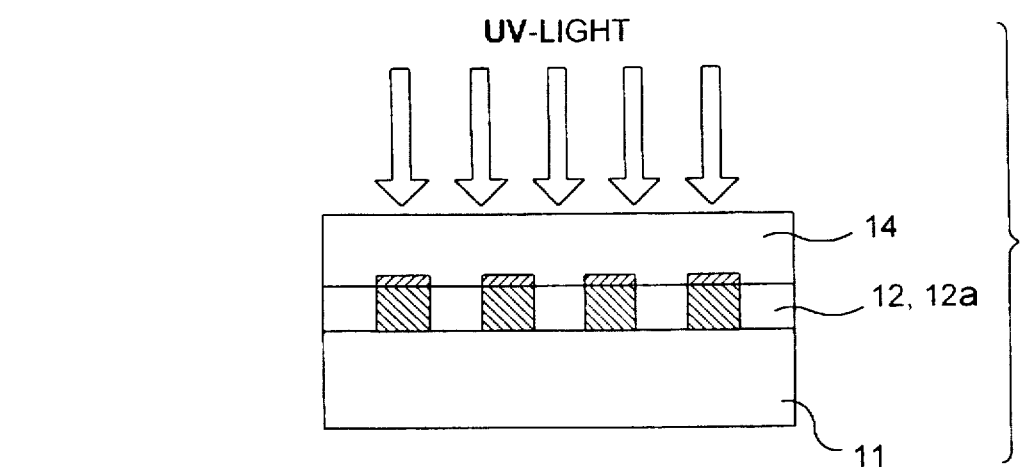
F I G. 2(b)
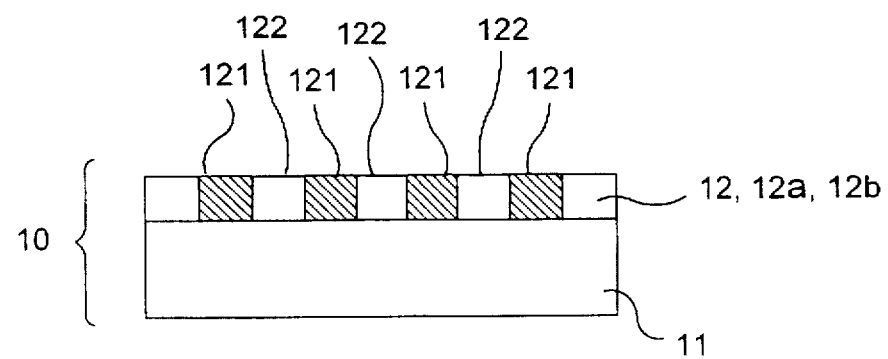
F I G. 2(c)

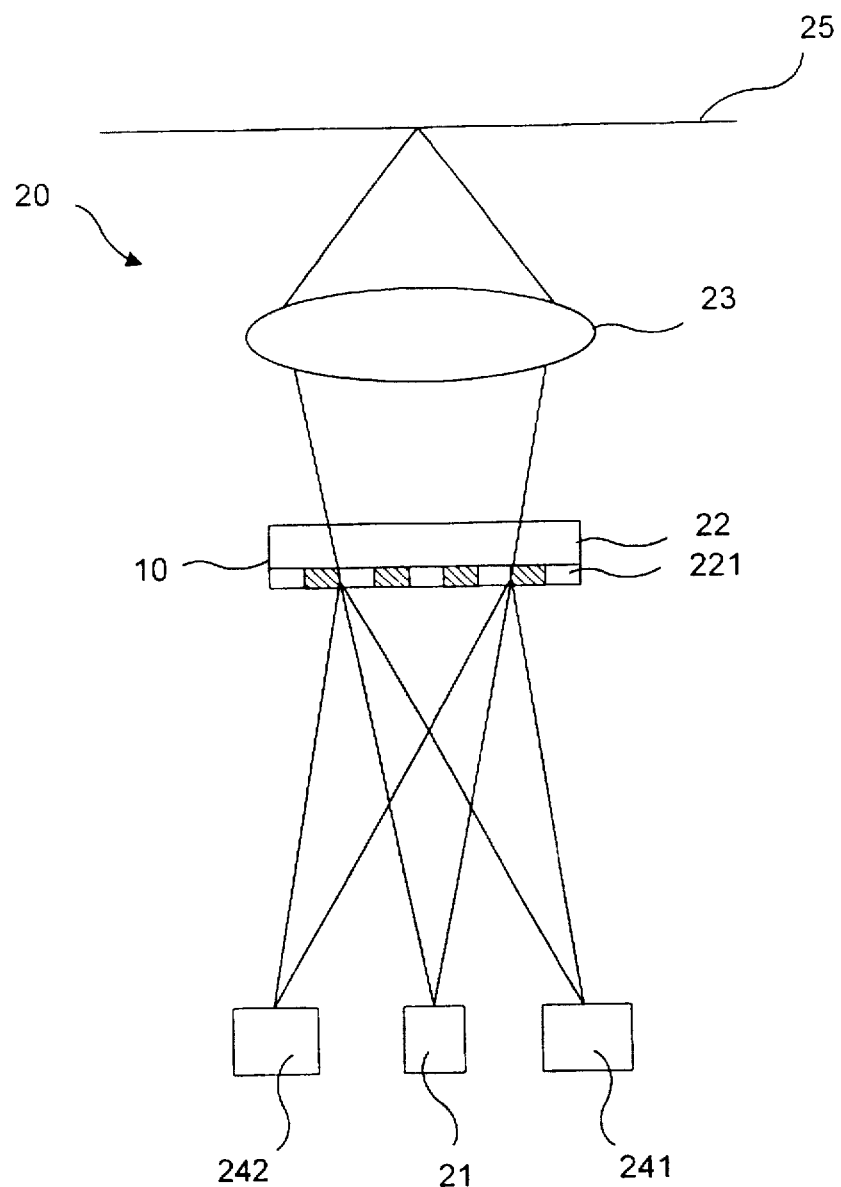
F I G. 3

POLARIZING BEAM SPLITTER AND METHOD FOR MANUFACTURING SAME

BACKGROUND OF THE INVENTION a) Field of the Invention

This invention relates to a polarizing beam-splitter used for an optical pickup head apparatus, and the like, which records/reproduces the information stored in an optical recording media such as an optical recording disk or a magneto-optical recording disk.

b) Description of the Related Art

In various optical head apparatus, a polarizing beam-splitter has different diffraction efficiencies for different polarized directions. Conventionally, to make this polarizing beam-splitter, an optically anisotropic lithium niobate oxide or titanium oxide crystalline substrate is formed of peaks and valleys on its surface and materials having an appropriate diffraction efficiency are filled in the valleys to form a periodic grating photo-mask. (Kokai H6-11616.)

However, those birefringent substrates made of $LiNbO_3$, $TiO_2$, and the like, are fabricated in a single crystal growth reactor. Therefore, resulting substrates themselves made in the conventional technology are costly, presenting a problem. Also, this manufacturing method for a polarizing beam-splitter requires creating a periodic grating photo-mask having valleys and peaks on an optical anisotrophic substrate and further requires filling in the valleys of the periodic grating photo-mask, thus complicating the manufacturing process. Consequently, the price of a polarizing beam-splitter is increased, thus making its manufacture costly. Moreover, when this expensive polarizing beam-splitter is used in an optical pickup head apparatus for use with a compact disk (hereafter denoted as CDS) or like optical recording media, the price of the optical pickup head apparatus is eventually increased.

OBJECT AND SUMMARY OF THE INVENTION

To resolve the problems described above, a primary object of this invention is to provide an inexpensive polarizing beam-splitter, which does not use an optically anisotropic substrate of $LiNbO_3$, $TiO_2$, etc., and a method for manufacturing it.

In accordance with the invention, a polarizing beam-splitter comprises an optically isotropics crystalline substrate and a birefringent material layer made of an oriented polydiacetylene film formed on the optically isotropic crystalline substrate. A periodic grating photo-mask is formed in the birefringent material layer by an area that is changed into a different color phase when an ultra violet light is irradiated in a predetermined pattern on the birefringent material layer and by an area in which the color remains unchanged. The periodic grating photo-mask has a diffraction efficiency for the orientation of the oriented polydiacetylene film in the area that is changed into a different color phase which is lower than that in the area in which the color is unchanged.

BRIEF DESCRIPTION OF THE DRAWINGS AND CHEMICAL FORMULAS

Figure 4A:
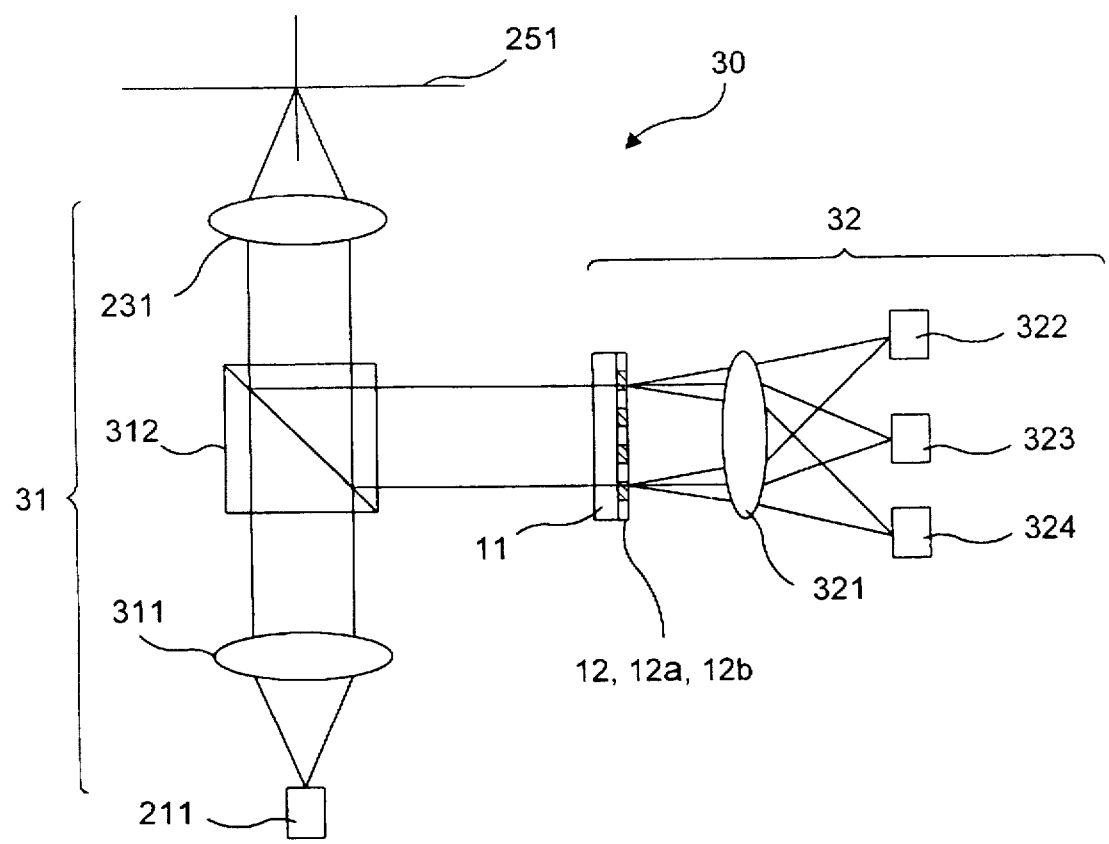
Figure 4B:
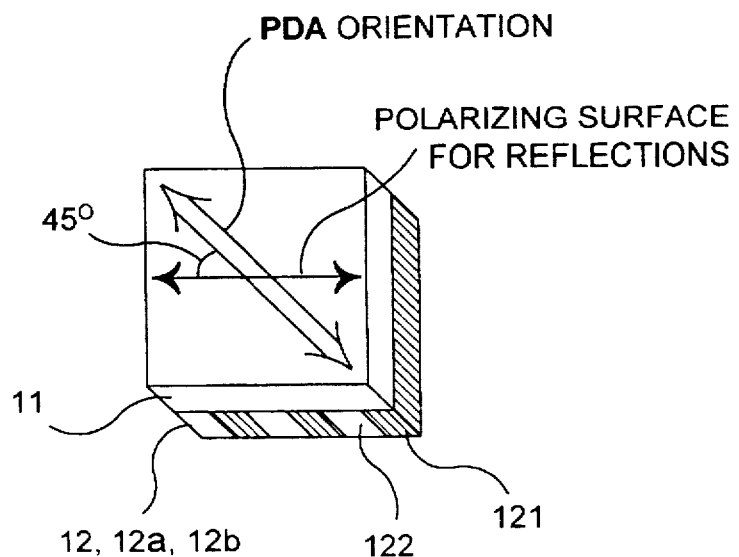

FIGS. 2(a), 2(b) and 2(c) descriptive diagrams illustrating the manufacturing method of the polarizing beam-splitter associated with an embodiment of this invention;

FIG. 3 is a schematic configuration of an optical pickup head apparatus using the polarizing beam-splitter associated with an embodiment of this invention;

FIG. 4(a) is a schematic configuration of the optical pickup head apparatus for detecting magneto-optical data using the polarizing beam-splitter associated with this invention; and FIG. 4(b) is a descriptive diagram for the polarizing beam-splitter.

Chemical Formulas 1-9 are depicted at the end of specification.

Chemical Formula 2 is commonly denoted as CmUCn;
Chemical Formula 3 is commonly denoted as PTS;
Chemical Formula 4 is commonly denoted as PTS-12;
Chemical Formula 5 is commonly denoted as DCHD;
Chemical Formula 6 is commonly denoted as HDU;
Chemical Formula 7 is commonly denoted as DFMDP;
Chemical Formula 8 is commonly denoted as TCDU; and
Chemical Formula 9 is commonly denoted as nBCMU.

DESCRIPTION OF THE PREFERRED EMBODIMENTS

This invention is described referring to the above drawings.

Figure 1A:
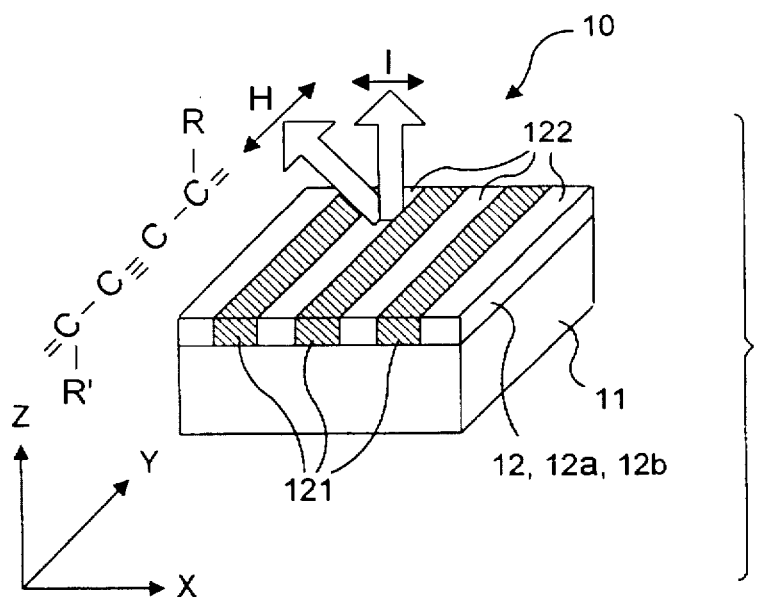
FIG. 1(a) is a perspective view of the polarizing beam-splitter associated with an embodiment of this invention.
Figure 1B:
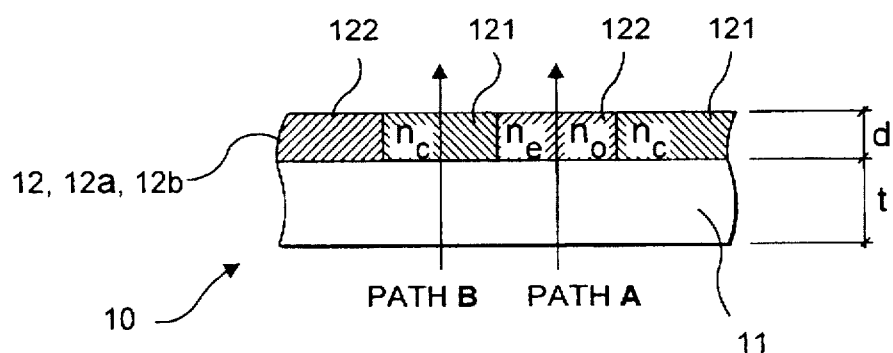
FIG. 1(b) is a cross sectional diagram of the polarizing beam-splitter associated with an embodiment of this invention.

FIGS. 1(a) and 1(b) are descriptive diagrams of the polarizing beam splitter of this invention.

As described in FIGS. 1(a) and (b), a polarizing beam-splitter 10 of this embodiment is constructed with an optical glass substrate 11 which is an optically isotropic substrate having a birefringent material layer of a predetermined thickness coated on the substrate 11.

The birefringent material layer 12 is formed from an oriented polydiacetylene (hereafter denoted as PDA) film 12a as illustrated in the chemical formulas below. In this embodiment, prior to the fabrication of the oriented PDA film 12a, a film (not illustrated) which provides orientation to the oriented PDA film is coated on the glass substrate 11.
[Chemical Formula 1]
where PDAs include those whose side chain groups Rs and R's in the chemical formula (1) are represented by the following chemical formulas 2-9:
[Chemical Formula 2]
[Chemical Formula 3]
[Chemical Formula 4]
[Chemical Formula 5]
[Chemical Formula 6]
[Chemical Formula 7]
[Chemical Formula 8]
[Chemical Formula 9]

An oriented PDA film 12a is, as illustrated in FIG. 1(a), oriented within the X-Y (two dimensional) plane while the direction (orientation) of the primary chain is in the Y-axis direction as marked with an arrow "H".

This oriented PDA film 12a has properties such that, when an ultra violet light (hereafter denoted as UV-light) is irradiated thereon, the molecular chain is cut off causing the change in the color from a blue-phase to a red and discolored-phase. The diffraction efficiency decreases along the oriented direction "H" as the phase changes.

This embodiment takes advantage of the properties such that the diffraction efficiency along the orientation of the oriented PDA film 12a varies periodically. That is, the periodic grating photo-mask is formed by the area that changed into a different color phase when UV-light is irradiated on the oriented PDA film 12a in a predetermined pattern and by the area 122 whose color-remained unchanged. Therefore, in the polarizing beam-splitter 10 of this embodiment, the diffraction efficiency for the orientation "H" varies periodically; the diffraction efficiency for the direction "T" perpendicular to the orientation "H" varies little. As a result, the oriented PDA film 12a works as a diffractive grating for the polarized light entering in the orientation "H"; it transmits the light polarized perpendicular to the orientation "H".

The polarizing beam-splitter 10 constructed in the above mentioned manner shows the properties described below. As illustrated in FIG. 1(b), the thickness of an optical glass substrate 11 is "t"; the thickness of the birefringent material layer 12 (oriented PDA film 12a) is "d"; the diffraction efficiency of the optical substrate is "ns"; the diffraction efficiency of the area 121, in the oriented PDA film 12a, whose color-phase is changed is "nc"; the diffraction efficiency for the area 122, in the oriented PDA film 12a, whose color-phase is unchanged under an ordinary light is "no"; the diffraction efficiency for the area 122 whose color-phase is unchanged under an extraordinary light is "ne" when the wave length of the beam emitted from a semiconductor laser is $\lambda$ and $k=2\pi/\lambda$. In the following descriptions, a normal light is defined as a polarized light vibrating orthogonal to the orientation "H" marked with an arrow "T"; an extraordinary light is defined as a polarized light vibrating along the orientation "H".

Orientation is lost in the area 121 whose color-phase is changed; therefore, the diffraction efficiency "nc" for the area 121 whose color-phase is changed to the ordinary light is almost equal to the diffraction efficiency "no" for the area 122 whose color is unchanged to ordinary light. In the polarizing beam-splitter 10 of this embodiment, for example, the diffraction efficiency with respect to a GaAlAs is semiconductor laser (wave length 780 nm) generally used for reading CDS are no=1.52, ne=2.12, and nc=1.52 respectively. Therefore, the polarizing beam-splitter 10 of this embodiment does not work as a periodic grating photo-mask for ordinary light and transmits all of the light. On the other hand, the relation between the diffraction efficiency "ne" for the area whose color-phase is changed 121 in reaction to the extraordinary light and that for the area whose color-phase is unchanged 122 in reaction to the extraordinary light is expressed as ne>nc. Therefore, the polarizing beam-splitter 10 of this embodiment works as a grating photo-mask for the extraordinary light.

Regarding the function of this diffractive grating, provided that the thickness of an oriented PDA film 12a is "d" and the thickness of an optical glass substrate 11 is "t", the phase of extraordinary light that passes through the area 122 whose color-phase is not changed (the route A takes in FIG. 1(b)) is represented as $$\{ns \cdot t + ne \cdot d\} \cdot k \qquad \text{Formula (1)}$$

The phase of extraordinary light that passes through the area whose color-phase is changed 121 (the route B takes in FIG. 1(b)) is expressed as $$\{ns \cdot t + nc \cdot d\} \cdot k \qquad \text{Formula (2)}$$

Therefore, the optical phase differential OPD (e) for the extraordinary light which corresponds to each of the routes A and B is derived from Formula (2)–Formula (1):

Optical Phase Differential (OPD) $(e)=(ne-nc) \cdot d \cdot k$     Formula (3)

Therefore, the polarizing beam-splitter 10 of this embodiment works as a grating photo-mask to extraordinary light as represented in Formula (3).

The polarizing beam-splitter 10 of this embodiment can be used as one of the optical elements which construct an optical pickup head apparatus for an MO optical magnetic recording medium and the like. In this application, it is preferable that all the extraordinary light is diffracted.

To diffract light in this way, one can fabricate a film of thickness d having

Figure 1C:
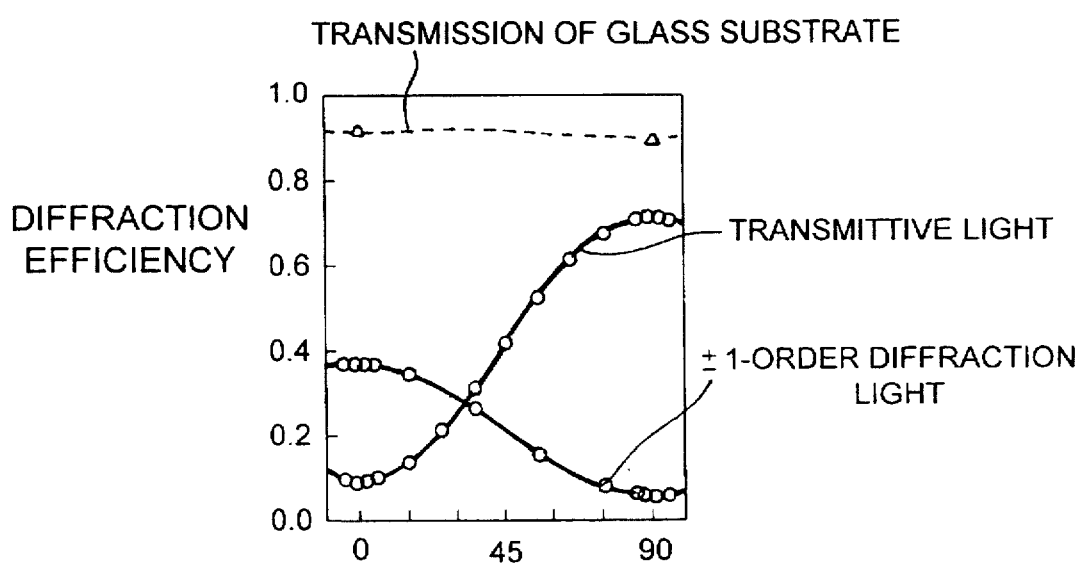
FIG. 1(c) is a graph plotting the relation between the diffraction efficiency of the polarizing beam-splitter vs the angle between the orientation and the polarized surface of the light passing through the splitter.

Optical Phase Differential $(OPD)(e) = (ne-nc) \cdot d \cdot k$    Formula (4)
$= \pi$ Note that the diffraction efficiency for the polarizing beam-splitter 10 of this embodiment is, for example, as illustrated in FIG. 1(c), when a light having a wave length of 780 nm enters 2.5 μm thick oriented PDA film of a polarizing beam-splitter 10, its diffraction efficiency for a transmittive (0-order) light and a diffractive light (±1-order) light vary based on the angle between the polarized surface of this light and the orientation of the polarizing beam-splitter 10. For this reason, in order to improve the diffraction efficiency for a diffractive light, one can match the polarized surface and orientation of a light.

As described above, in this embodiment, a periodic grating photo-mask 12b is formed by the area whose color-phase is changed 121 (orientation is lost) and by the area whose color is unchanged 122 (orientation is maintained) which are formed on the oriented PDA film 12a on an optical glass substrate 11. therefore, the polarizing beam-splitter 10 does not work as a diffractive grating for ordinary light, but it does for extraordinary light. In addition, this embodiment provides an inexpensive polarizing beam-splitter 10 using an inexpensive optical glass substrate in place of an optically anisotropic substrate made of $LiNbO_3$ or $TiO_2$, etc.

FIG. 2 is a descriptive diagram illustrating a manufacturing steps for the polarizing beam-splitter 10 of this embodiment.

In the manufacturing method of this embodiment, firstly, a film layer (not illustrated) comprising polyethylene terephthalate as an orienting material is coated on the optical glass substrate 11. This film layer is made by dissolving polyethylene terephthalate into a small amount of 1,1,1,3,3,3-hexafluoro-2-propanol until it saturates. The solution is then diluted with 1,1,2,2-tetrachloroethane by 10. The diluted solution less the residue and the like is spin coated on a glass substrate 11 which is optically isotropic at room temperature (about 15° C.–20° C.) The film thickness is, for example 1000 Å–2000 Å.

Secondly, as illustrated in FIG. 2(a), diacetylene monomer is evaporation deposited under vacuum on the film layer. During deposition under vacuum evaporation, diacetylene monomer Is oriented to the orientation of the film layer voluntarily. In this embodiment, about 100 nm to 1000 nm thick diacetylene monomer is deposited under vacuum evaporation at the process temperature of 124° C. using resistance heating at deposition rate of 15 Å/sec.~5 Å/sec. at $1\times10^{-5}$ torr.

Next, the diacelylene monomer film is polymerized by means of UV-photo-polymerization. During this polymerization. The film is irradiated by UV-light from an ultra high pressure Hg lamp with the output intensity of about 0.1 W/cm$^{-2}$. The irradiation time is 12 minutes for a 120 nm thick film (60 minutes for a 650 nm thickness, 90 minutes for a 1000 nm thickness.)

Then, the UV-light is selectively irradiated on the PDA to form a periodic grating photo-mask 12b. When irradiating the UV light, firstly, as illustrated in FIG. 2(b), a photo-mask 14 (chrome mask) having a diffractive grating photo-mask pattern is arranged on the PDA and the UV-light collimated in parallel is irradiated thereon. For this step, an ultra high pressure Hg lamp is used for a light source having an intensity of about 0.9 W/cm$^{-2}$, with exposure time of about 40 to 60 minutes for 650 nm thickness (15 to 20 minutes for 120 nm thickness.) As a result, as illustrated in FIG. 2(c), the molecular chain of the masked PDA on the photo-mask 14 is broken by the UV irradiation, thus changing its color-phase to represent the area whose color-phase is changed 121. On the other hand, the unexposed PDA does not change its color-phase, thus representing the area whose color-phase is unchanged 122. Taking all the steps mentioned above, the polarizing beam-splitter 10 illustrated in FIG. 1(a) may be obtained.

As described, a method of manufacturing the polarizing beam-splitter of this embodiment provides the polarizing beam-splitter 10 having different diffraction efficiencies for ordinary and extraordinary light simply by irradiating UV-light on the PDA selectively. Therefore, the process of forming a periodic grating photo-mask having peaks and valleys using photolithographical technology or machining is not required, significantly simplifying the manufacturing process for the polarizing beam-splitter 10. As a result, an inexpensive polarizing beam-splitter 10 can be provided. Expensive equipment is also not required for manufacture.

In the process steps mentioned above, polyethylene terephthalete is coated as a film layer on the optical glass substrate 11, then a diacetylene monomer is deposited under vacuum evaporation thereon; however, the fabrication process may be as described below.

First, a diacetylene monomer of the approximate 100 Å thick is coated, for example, by vacuum evaporation deposition method onto the optical glass substrate 11, and then the diacetylene monomer is polymerized by means of UV-photo polymerization in the air.

Next, polymerized diacetylene, that is, polydiacetylene (PDA) is rubbed in one direction with, for example, a silicon pad and the like. With such a treatment, the PDA is oriented in the rubbing direction.

Next, the PDA is fabricated to a predetermined thickness on the rubbed PDA. In other words, the diacelylene monomer is fabricated on the PDA, then is polymerized by means of UV photo-polymerization. In this case, the polymerized PDA is oriented in the rubbing direction.

Next, on the PDA is arranged a diffractive grating photo mask 14, and UV-light collimated in parallel is irradiated thereon, to obtain a polarizing beam-splitter 10 as illustrated in FIG. 1.

Even in such a method for manufacturing the polarizing beam-splitter, merely irradiating the UV-light onto the oriented PDA film 12a can provide it with a functionality of a polarizing beam-splitter. As a result, an inexpensive polarizing beam-splitter 10 can be provided.

FIG. 3 illustrates a simplified configuration for an optical pick up head apparatus using the polarizing beam-splitter of this embodiment.

An optical pick up head apparatus 20 of this invention comprises a semi-conductor laser 21 which is a light source to emit a laser beam; a λ/4 plate 22 arranged on the optical path of the laser beam; an objective lens 23 arranged on the optical path of the laser beam and, opposite, an optical recording medium 25 such as a CD; and two photo diodes 241 and 242 for photo detection arranged close to the semiconductor laser 21.

On the surface 221 of the λ/4 plate 22 on the side of semiconductor, a polarizing beam-splitter 10 of this embodiment is secured. The polarizing beam-splitter 10 is arranged so that the polarized surface of the laser beam emitted from the semiconductor laser 21 is perpendicular to the oriented direction of the PDA. For this, the laser beam emitted from the semiconductor laser 21 passes through smoothly as the ordinary light. The polarizing beam-splitter 10 is fabricated to the film thickness which satisfies Formula (4); therefore, the extraordinary light diffracts.

In the optical pick up head apparatus 20 configured above, the laser beam emitted from the semiconductor laser 21 enters the polarizing beam-splitter 10. The polarizing beam-splitter 10 is designed to fulfill Formula (4) for the oriented PDA film thickness to make the laser beam ordinary light. Therefore, all laser beams pass through the polarizing beam splitter 10, then, through the λ/4 plate 22, until they are converged onto the optical recording medium 25 via the objective lens 23.

The converged laser beams reflect varying modulated intensity based on the data recorded on the optical recording media 25 to pass through the λ/b 4plate 22 via the objective lens 23. Meanwhile, the laser beam is converted from ordinary light to the extraordinary light. For this reason, all the reflected beams are diffracted by the polarizing beam-splitter 10, and converged to the two photo diodes 241 and 242.

The polarizing beam-splitter 10 is constructed on the surface of the λ/4 plate 22, as described, such that the optical element has the functionality of a polarizing beam-splitter. Conventional polarizing beam-splitters have been an expensive optical component. However, if the polarizing beam-splitter 10 is constructed on the surface of the λ/4 plate 22 as described above, an inexpensive optical pick up head apparatus 20 can be provided.

FIG. 4 is an overview of the optical pickup head apparatus using the polarizing head apparatus of this embodiment.

The optical pickup head apparatus 30 of this embodiment is the optical pickup head apparatus for a magneto-optical recording medium. As illustrated in FIG. 4(a), it is constructed with an illuminator section 31 and a detector section 32. The illuminator section 31 is constructed between a semiconductor laser 211 for emitting laser beams and a magneto-optical recording medium 251, wherein a collimator lens 311, a beam splitter 312, and an objective lens 231 are arranged therebetween respectively viewed from the direction the light is emitted.

On the other hand, the detector section 32 comprises the polarizing beam-splitter 10 and three photo diodes 322, 323, and 324 wherein the polarizing beam-splitter 10 splits reflections from the magneto-optical recording medium 251 into diffractive light and transmittive light; the photo diodes detect the diffractive light and the transmittive light emitted from the polarizing beam-splitter 10 via a lens 321.

In the illuminator section of the optical pickup head apparatus 30 of this embodiment, the laser beams emitted from the semiconductor laser 211 are converted to parallel lights by the collimator lens 311. They pass through the beam-splitter 312, and then are converged at the magneto-optical recording medium 251 via an objective lens 231. The converged laser beams are reflected while its polarized surface is rotated according to the data recorded on the magneto-optical recording medium; they enter the beam-splitter 312 again via the objective lens 231. The re-entered laser beams are reflected to the detector section 32 via the beam splitter 312.

The laser beams enter the polarizing beam-splitter at this time. The polarizing beam-splitter 10 is designed to fulfill Formula (4) for the thickness of oriented PDA film 12a. Also, as illustrated in FIG. 4(b), the polarizing surface for the entering laser beam is arranged to be about 45 degree with respect to the orientation of the oriented PDA film 12a. Therefore, the laser beams entering the polarizing beam-splitter 10 can be classified into two components (ordinary light and extraordinary light) which are polarized orthogonal to each other. In this way, the laser beams are separated into the transmittive light (ordinary light) transmitted by the polarizing beam-splitter 10 and diffractive light (extraordinary light) which diffracts at the polarizing beam-splitter 10. Between the two types of light, the transmittive light is detected by the photo diodes 323 via the lens 321; the diffractive light is detected by the photo diode 322 and 324 via the lens 321.

With this configuration, each of the photo diodes 322, 323, and 324 provide the pre-assigned detection for data collection and processing according to the type of light they detected. For example, the data recorded on the magneto-optical recording medium can be detected based on the differential between the amount of light received at the photo diodes 322 and 324 and at the photo diode 323. In this way the polarizing beam-splitter 10 can be used in a so called differential optical system. Because of this, a λ/2 plate or a polarizing beam-splitter has been used conventionally to construct a differential optical system. However, these optical elements can be eliminated using the polarizing beam-splitter 10 of this invention. Reducing the number of components makes it possible to provide an inexpensive optical pickup head apparatus for the magneto-optical medium.

As described above, the polarizing beam-splitter of this invention is constructed such that the oriented PDA film is coated on an optically isotropic crystalline substrate. The film is UV-irradiated in a predetermined pattern to form a periodic grating photo-mask having an area that is changed into a different color phase and an area in which the color remained unchanged. According to this invention, an inexpensive polarizing beam-splitter can be provided because the polarizing beam-splitter can be constructed on a normal optical isotropic substrate in place of an optically anisotropic crystalline substrate such as $NibO_3$ or $TiO_2$. In addition, a periodic grating photo-mask can be formed simply by irradiating UV-light on the oriented PDA film in a predetermined pattern to obtain its functionality as a polarizing beam-splitter. Therefore, the manufacturing process does not require the complex construction of forming periodic valleys and peaks via the photolithographic technology or machining. As a result, the manufacturing process is simplified, thus providing an inexpensive polarizing beam-splitter.

In addition, by using the polarizing beam-splitter of this invention for an optical component of an optical pickup head apparatus, an inexpensive optical pickup head apparatus can be obtained.

While the foregoing description and drawings represent the preferred embodiments of the present invention, it will be obvious to those skilled in the art that various changes and modifications may be made therein without departing from the true spirit and scope of the present invention.

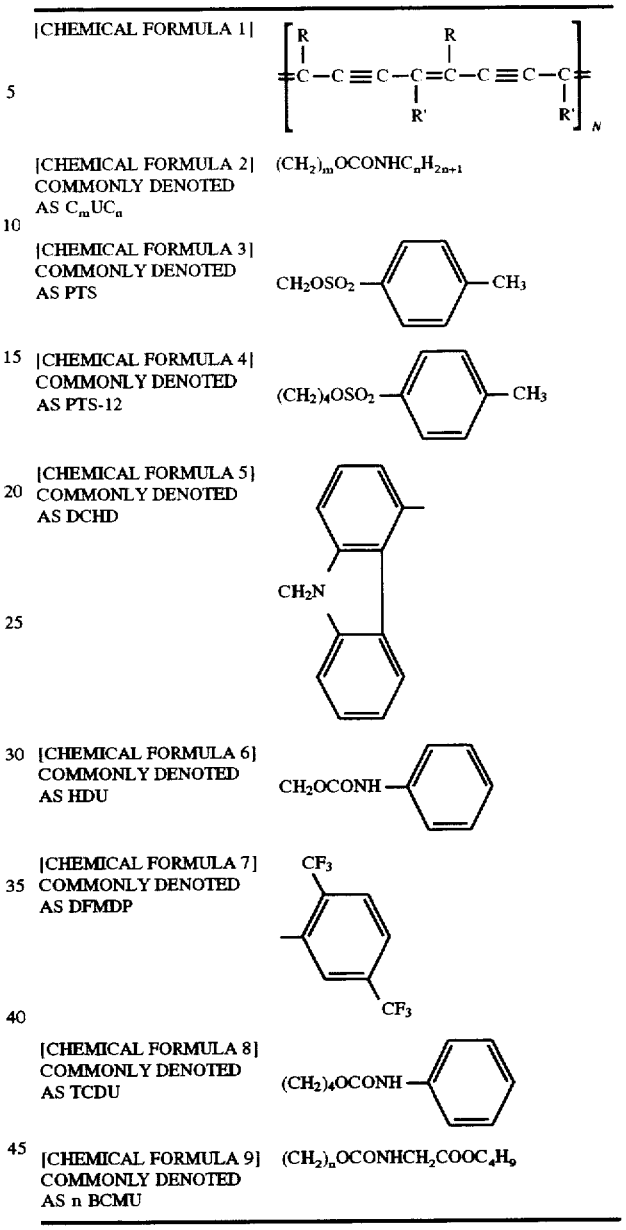

What is claimed is:
1. A polarizing beam-splitter comprising:
   an optically isotropic crystalline substrate;
   a birefringent material layer made of an oriented polydiacetylene film formed on said optically isotropic crystalline substrate; and
   a periodic grating photo-mask being formed in said birefringent material layer by an area that is changed into a different color phase when an ultra violet light is irradiated in a predetermined pattern on said birefringent material layer and by an area in which the color remains unchanged;
   said periodic grating photo-mask having a diffraction efficiency for the orientation of said oriented polydiacetylene film in said area that is changed into a different color phase being lower than that in said area in which the color is unchanged.
2. The polarizing beam-splitter according to claim 1, having a film layer which provides an orientation to the oriented layer being disposed between said optically isotropic substrate and said oriented polydiacetylene film.

3. An optical pickup head apparatus comprising:

an illuminating element;

an objective lens arranged on the optical path of the outgoing beam emitted from said illuminating element facing an optical recording medium; and an optical element for guiding the returning beam from said optical recording medium to a detector element;

said optical element being equipped with a polarizing beam-splitter including:

an optically isotropic crystalline substrate;

a birefringent material layer made of an oriented polydiacetylene film formed on said optically isotropic crystalline substrate; and a periodic grating photo-mask being formed in said birefringent material layer by an area that is changed into a different color phase when an ultra violet light is irradiated in a predetermined pattern on said birefringent material layer and by an area in which the color remains unchanged;

said periodic grating photo-mask having a diffraction efficiency for the orientation of said oriented polydiacetylene film in said area that is changed into a different color phase being lower than that in said area in which the color is unchanged.

4. An optical pickup head apparatus comprising:

an illuminating element;

an objective lens arranged on the optical path of the outgoing beam emitted from said illuminating element facing an optical recording medium; and an optical element for guiding the returning beam from said optical recording medium to a detector element;

said optical element being equipped with a polarizing beam-splitter including:

an optically isotropic crystalline substrate;

a birefringent material layer made of an oriented polydiacetylene film formed on said optically isotropic crystalline substrate; and a periodic grating photo-mask being formed in said birefringent material layer by an area that is changed into a different color phase when an ultra violet light is irradiated in a predetermined pattern on said birefringent material layer and by an area in which the color remains unchanged;

said periodic grating photo-mask having a diffraction efficiency for the orientation of said oriented polydiacetylene film in said area that is changed into a different color phase being lower than that in said area in which the color is unchanged; and wherein a film layer which provides an orientation to the oriented layer is disposed between said optically isotropic substrate and said oriented polydiacetylene film.

* * * * *